United States Patent [19]
Wade et al.

[11] Patent Number: 5,474,329
[45] Date of Patent: Dec. 12, 1995

[54] PET RETAINER

[76] Inventors: Wanda E. Wade; Kenneth Elwyn, both of 1709 Crawford Dr., Rockville, Md. 20851

[21] Appl. No.: 304,929

[22] Filed: Sep. 13, 1994

[51] Int. Cl.$^6$ .................................................. B60R 21/05
[52] U.S. Cl. ..................... 280/749; 297/228.11
[58] Field of Search ................... 280/748, 749; 297/228.11

[56] References Cited

U.S. PATENT DOCUMENTS

| | | | |
|---|---|---|---|
| 2,619,156 | 11/1952 | Seaman | 297/228.11 |
| 4,311,339 | 1/1982 | Heath | 280/749 |
| 4,396,227 | 8/1983 | Neilson | 297/228.11 |
| 4,924,814 | 5/1990 | Beaudet | 280/749 |
| 4,955,636 | 9/1990 | Sundberg et al. | 280/749 |

*Primary Examiner*—Kenneth R. Rice
*Attorney, Agent, or Firm*—Brooks & Kushman

[57] ABSTRACT

A pet retainer mounts on an automobile passenger seat and serves to retain pets, such as a cat or a dog. Retainers formed of a web of netting which envelopes the seat and is secured to the border points of the seat. The pet is placed onto the seat and contained within the web of netting. The netting serves to retain the pet from forward displacement upon sudden deceleration of the automobile. The retainer may be used in conjunction with a pet safety harness coupled to the safety belt restraint system.

6 Claims, 3 Drawing Sheets

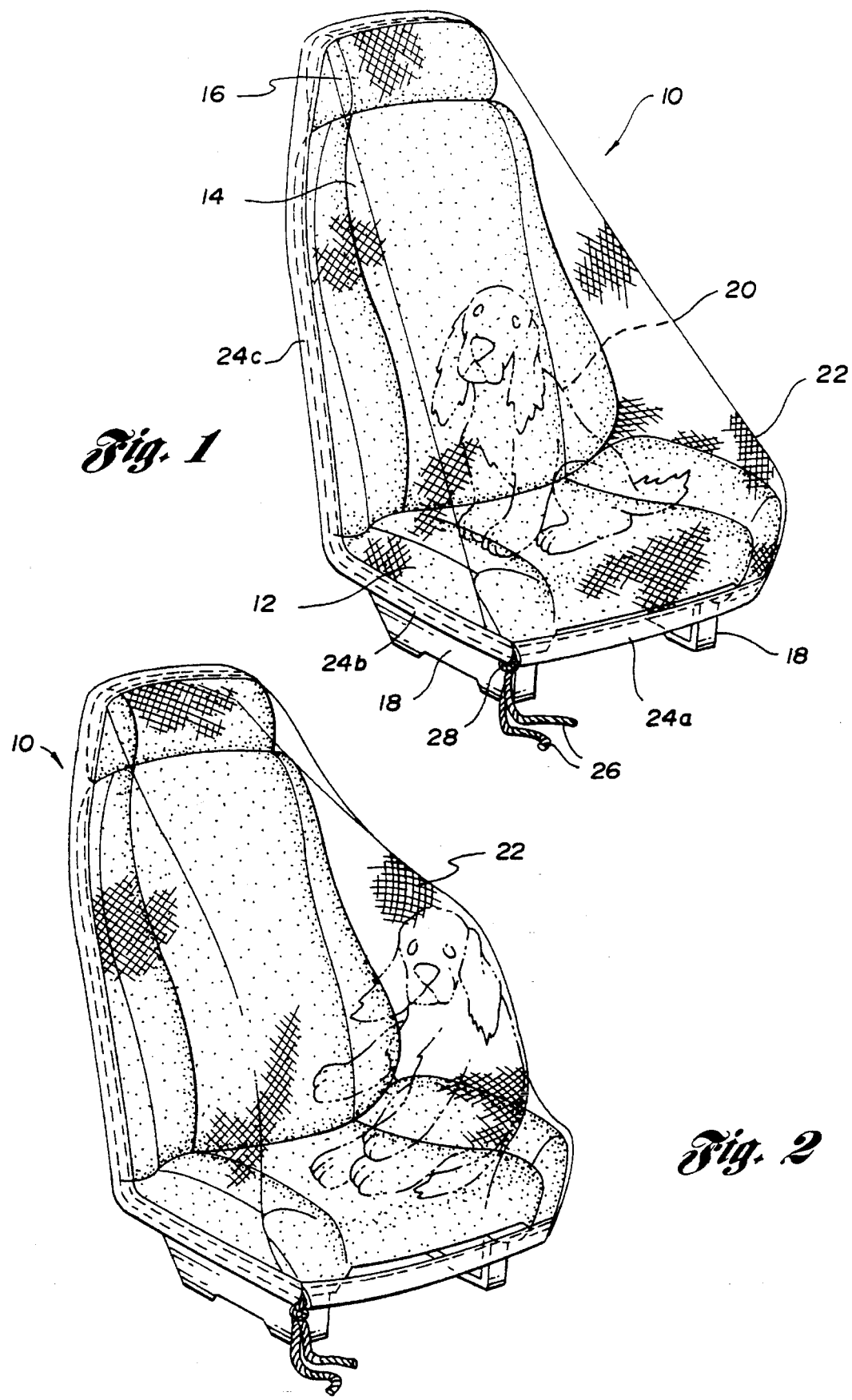

PET RETAINER

TECHNICAL FIELD

The present invention concerns the retention of pets in an automobile passenger seat.

BACKGROUND ART

A common problem for many dog and cat owners is a convenient way to retain the pet on an automotive seat. A pet may tend to become restive or wander within the interior of the vehicle. Also, it may be desirable to augment the harness-type pet restraint systems with a retainer to assist in restraining forward movement of the pet during sudden deceleration of the automobile.

The common technique of coupling the pet's neck collar to the seat structure through a leash or other device is undesirable and risks danger to the pet upon sudden deceleration of the vehicle.

DISCLOSURE OF THE INVENTION

The present invention concerns a pet retainer adapted to contain a dog or cat in position on an automobile seat. The retainer affords a reasonable amount of freedom of movement for the pet on the seat, but limits the pet's ability to move away from its assigned seat and disturb other passengers or the driver. Also, the pet retainer tends to assist in restraining the pet from forward or lateral displacement upon sudden deceleration or impact of the automobile.

The pet retainer includes a web of netting dimensioned and shaped sufficiently to envelope the seating area for containment of the pet on the seat. The web is secured at one or more border points to the seat structure. One exemplary means for fastening the retainer to the seat is to border the web with a sleeve or casing of strong fabric, such as canvas, and have an elasticized drawstring within to facilitate installation and removal of the pet retainer.

In an alternative embodiment, the pet retainer may include a frame member to assist in spacing the web of netting from the seat to ensure sufficient room or clearance for the pet to ride comfortably on the seat. The frame member functions as a bow to hold the netting away from the seat to afford the needed room or clearance. Each end of the frame member is connected to an opposition side of the seat base, and the member projects outwardly from the seat over its lateral dimension to hold away the web of netting to afford room for the pet to ride comfortably.

BRIEF DESCRIPTION OF THE DRAWINGS

FIG. 1 is a view of a pet contained within the pet retainer of the present invention installed on a conventional bucket seat;

FIG. 2 is another view of FIG. 1 showing the tendency of the web of netting to retain the pet upon sudden deceleration or impact of the vehicle;

BEST MODE FOR CARRYING OUT THE INVENTION

Figure 3:
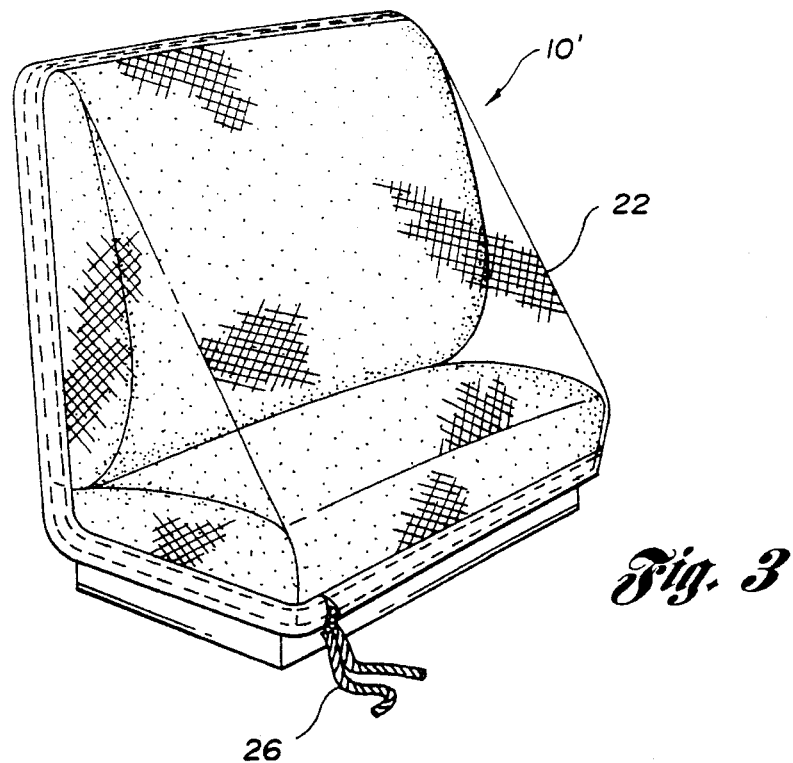
FIG. 3 is another embodiment of the pet retainer shown installed on a bench-type automobile seat.

A conventional automobile bucket seat is shown generally at 10 in FIG. 1. The seat 10 comprises a seat base 12, contoured back 14, and head rest 16. The seat is supported on a platform 18 which anchors to the floor of the automobile.

A dog, indicated at 20, is situated on the seat 10 in a conventional manner. The dog is contained on the seat by a web of netting 22 of dimensions sufficient to envelope the seat. The netting is preferably a nylon mesh (available through retail fabric stores) which has sufficient resilience to distend upon forward or lateral displacement of the pet to absorb the pet's kinetic energy.

The netting 22 is bordered by segments of a casing or sleeve sewn onto the edges of the netting. Exemplary segments are shown at 24a (lower front of seat base), 24b (lateral portion of seat base), and 24c (vertical segment of seat back and head rest). The sleeve segment is preferably fabricated of canvas or like material of relatively high tensile strength.

A drawstring, whose free ends are shown at 26, is threaded through the sleeve segments. A preferred type of drawstring is an elasticized cord, which may be knotted as shown at 28, or joined by a conventional drawstring retainer. This type of fastening means facilitates the installation and removal of the pet retainer from the seat 10. Other types of devices for fastening the pet retainer to the seat 10 are within the scope of this invention, e.g. hook-and-pile mating fasteners, or analogous fasteners for conventional seat covers.

FIG. 2 shows the pet 20 being retained on the seat 10 during sudden deceleration or impact. The displacement of the pet is resisted by the web of netting 22. The elasticity of nylon mesh serves well to absorb the kinetic energy of the pet, with an attendant return to the original position.

The pet retainer of the present invention may be used to augment a pet restraint system, such as a harness which surrounds the trunk of the pet's body and couples through the passenger safety belt restraint system.

FIG. 3 shows the pet retainer of the present invention modified slightly in shape and dimension to adapt it for enveloping a conventional bench seat.

Figure 4:
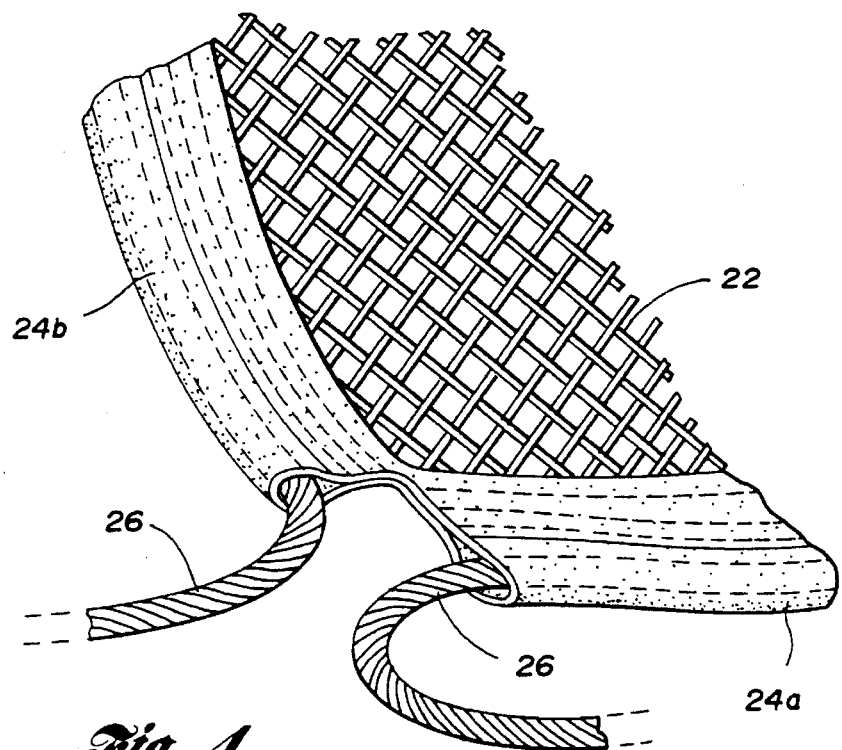
FIG. 4 is an enlarged, fragmentary view of the border sleeve of the pet retainer showing the free ends of the elasticized drawstring.

FIG. 4 shows in greater detail the preferred form of fastening the web of netting 22 onto the seat. The free edges of the netting are sewn within lapped borders of a canvas sleeve, shown in segments 24a and 24b. The sleeve contains a drawstring 26 which allows ready tightening or release to facilitate installation and removal of the pet retainer from the seat.

Figure 5:
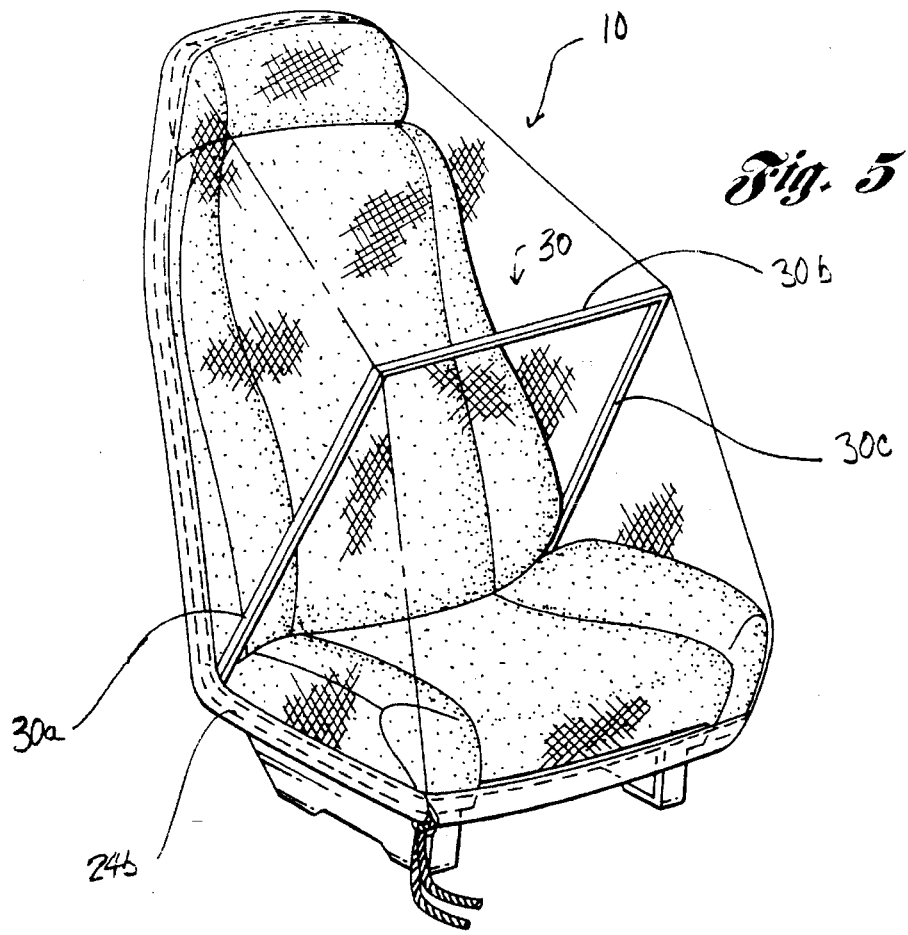
FIG. 5 is a view of an alternative embodiment of the invention including a frame member to space the web of netting from the seat.

FIG. 5 shows the invention modified in an alternative embodiment to include a frame member 30 which serves as a bow to space the web of netting 22 away from the seat 10 to afford needed room or clearance for a pet. The frame member 30 has 3 segments defining a generally rectangular shape. The free end of segment 30a is connected to the sleeve segment 24b, and the free end of segment 30c is connected to the sleeve segment at the opposite side (not shown). The segments 30a and 30c project away from the seat, and are joined at their projecting ends by lateral segment 30(b). The segments 30 may be formed of pliant material (such as plastic), and may be formed integrally in a continuous frame member, or through connection of segments to form a unitary frame member. The manner of connection of the free ends of the segments 30*a* and 30*c* is one of design choice, e.g., adhesive, fasteners, sewing, pivots, or other form of securement. Also, the frame member 30 may be formed in a different geometric shape, such as a bow forming a half-ellipse or semi-circle.

Figure 6:
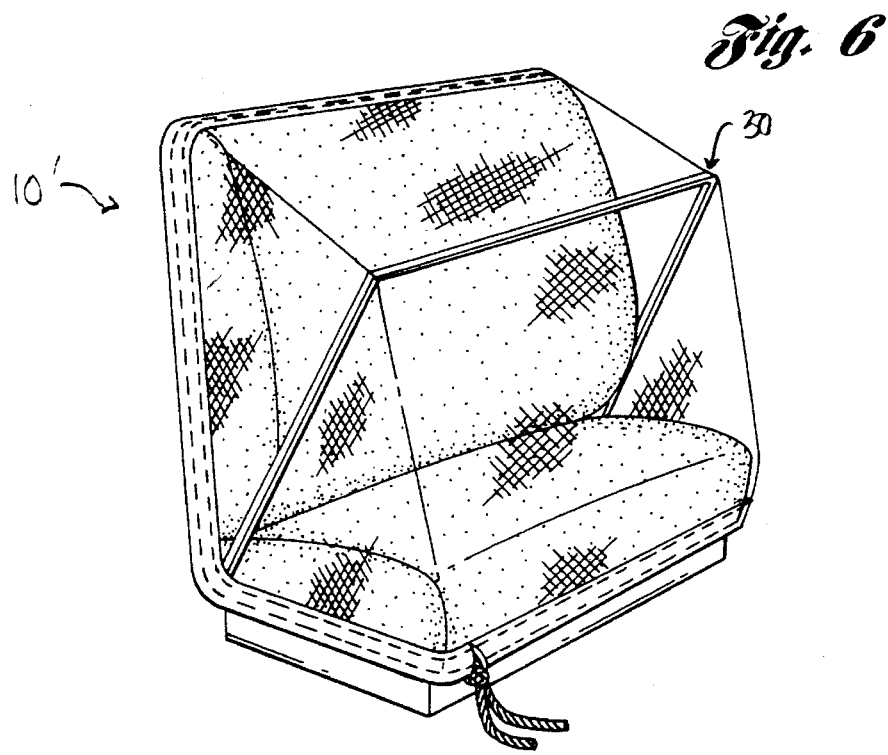
FIG. 6 is the alternative embodiment of the invention with a frame member applies to a bench-type automobile seat.

FIG. 6 shows the frame member 30 adapted to a bench-type automobile seat 10'.

While the best mode for carrying out the invention has been described in detail, those familiar with the art to which this invention relates will recognize various alternative designs and embodiments for practicing the invention as defined by the following claims.

What is claimed is:

1. A device for retaining a pet on a seat during normal operation of an automobile comprising:

a web of mesh netting of shape and dimension sufficient to envelope the seat for containment of the pet on the seat and permitting the pet freedom of movement upon the seat; and fastening means, associated with the web, for fastening the web in enveloping relation of the seating area.

2. The pet retainer of claim 1 wherein the fastening means includes a sleeve coupled to the border of the netting, and containing a drawstring to facilitate tightening and loosening upon installation and removal, respectively.

3. The pet retainer of claim 2 wherein the drawstring comprises an elasticized cord.

4. The pet retainer of claim 2 wherein the sleeve is segmented to facilitate installation and removal.

5. The pet retainer of claim 1 further comprising spacer means for spacing the envelope of the netting web from the seat to enhance the room for the pet while maintaining containment of the pet on the seat.

6. The pet retainer of claim 5 wherein the spacer means includes a frame member associated with the fastening means, which contacts the interior of the web of netting and projects it away from the seat.

\* \* \* \* \*